US007136898B1

(12) United States Patent
Chisaki et al.

(10) Patent No.: US 7,136,898 B1
(45) Date of Patent: Nov. 14, 2006

(54) SYSTEM AND METHOD FOR ENHANCED EFFECTIVENESS OF NON-REQUESTED INFORMATION IN MESSAGES

(75) Inventors: Paul Chisaki, Fremont, CA (US); Michael Raneri, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 893 days.

(21) Appl. No.: 09/718,691

(22) Filed: Nov. 22, 2000

(51) Int. Cl.
*G06F 15/16* (2006.01)
(52) U.S. Cl. .................. 709/206; 709/217; 709/203; 705/14; 705/35; 705/36 R
(58) Field of Classification Search ............. 709/203, 709/217–219, 223, 206; 707/10; 705/14, 705/35, 36
See application file for complete search history.

(56) References Cited

U.S. PATENT DOCUMENTS

| | | | | |
|---|---|---|---|---|
| 5,710,884 A | * | 1/1998 | Dedrick | 709/217 |
| 5,793,497 A | | 8/1998 | Funk | |
| 5,937,162 A | * | 8/1999 | Funk et al. | 709/206 |
| 5,987,434 A | | 11/1999 | Libman | |
| 5,987,435 A | * | 11/1999 | Weiss et al. | 705/36 |
| 6,021,397 A | * | 2/2000 | Jones et al. | 705/36 R |
| 6,064,985 A | * | 5/2000 | Anderson | 705/36 R |
| 6,076,072 A | | 6/2000 | Libman | |
| 6,317,789 B1 | * | 11/2001 | Rakavy et al. | 709/203 |
| 6,460,036 B1 | * | 10/2002 | Herz | 707/10 |
| 6,487,538 B1 | * | 11/2002 | Gupta et al. | 709/219 |
| 6,601,044 B1 | * | 7/2003 | Wallman | 705/35 |

OTHER PUBLICATIONS

Morall, *Customize Your Cross-Sell*, Mar. 1993, Bank Marketing vol. 25, Iss. 3, pp. 14-17, Bank Marketing Association, Washington, Reprinted via ProQuest.
A. Hughes, *The Complete Database Marketer*, 1991, pp. 48-53, 58-121, 134-135, 162-163, 199-200, 218-219, 274-275, 397-399, 538-539. Probus Publishing Co., Chicago, IL.
M. Nowesnick, Ed., *Relationship Marketing: Process, Performance & Profit*, 1993, Table of contents, pp. 1-7, 10-13, 16-17, 26-31, 46-54, 58-61, 74-75, 78-79, 86-89, 94-95, 136-139 Financial Institutions Marketing Assocation, Chicago, IL.
A. Holtman & D. Mann, Eds, *The New Age of Financial Services Marketing: A Hands-on Applications Guide to harnessing the Power of Database Marketing*, 1992, Financial Sourcebooks, Naperville, IL.
D. Peppers & M. Rogers, *The One to One Future: Building Relationships One Customer at a Time*, 1993, pp. 6-7, 242-243, 394-397, Currency/Doubleday, New York, NY.
S. Godin, *eMarketing*, 1995, pp. 18-21, 228-229, 250-255, Perigee Books/Berkeley Publishing Group, New York, NY.
D. Jackson, "Penney's' Is Heavenly," Direct Marketing, 1994, pp. 36-40, vol. 57 Iss. 6, Garden City, NY.

(Continued)

*Primary Examiner*—Philip B. Tran
(74) *Attorney, Agent, or Firm*—Innovation Partners; Charles E. Gotlieb

(57) ABSTRACT

A method and apparatus identifies and adds information relevant to a user but not requested by the user to information requested by a user to form a message such as an e-mail message and provides the message to the user.

42 Claims, 3 Drawing Sheets

OTHER PUBLICATIONS

A. Hughes, *The Complete Database Marketer,* 1991, pp. 126, 187, 202, Probus Publishing Co., Chicago, IL.

D. Jackson, 151 Secrets of Insurance Direct Marketing Practices Revealed, 1989, pp. 19, 56, 117, 174, 179, 238-239, Nopoly Press, Wilmington, DE.

A. Holtman & D. Mann, Eds, *The New Age of Financial Services Marketing: A Hands-on Applications Guide to Harnessing the Power of Database Marketing,* 1992, pp. 200, 302-303, 317, Financial Sourcebooks, Naperville, IL.

* cited by examiner

SYSTEM AND METHOD FOR ENHANCED EFFECTIVENESS OF NON-REQUESTED INFORMATION IN MESSAGES

FIELD OF THE INVENTION

The present invention is related to computer software and more specifically to messaging computer software such as e-mail computer software.

BACKGROUND OF THE INVENTION

Messages such as E-mail, pager alerts, instant messages, wireless messages and the like may be used to provide information to one or more recipients. When messages are used for marketing purposes, two types of information may be sent.

The first type of information is information that is requested by the intended recipient. For example, a target party may wish to receive a daily roundup of news information related to stocks in his or her portfolio and other stocks of interest. The target may log on to a web site and select the option to receive information related to stocks in the target's portfolio, and may define lists of other securities about which the target wishes to receive information. An automated system may collect this information from various sources and provide it to the target on a daily basis in one or more e-mail messages. People tend to pay particular attention to this type of information because they know it will be relevant to their interests, since they select the types of information they will receive.

Another type of information sent via messages is information that is not requested by the recipient. Such information currently includes information many users do not feel is relevant to their interests: get-rich-quick schemes, advertisements for penny stocks, and advertisements for less-than-tasteful web sites. Recipients of such messages tend to ignore the message because most of the information thus received is not relevant to the user's interests. Even information that the user may find highly relevant is ignored because the user tends to assume that virtually any information that is not requested by the recipient will be similar to other such messages and will not be relevant to the user's interests. Thus, much non-requested information that a party may find relevant to his or her interests is not communicated because the originator of the information knows the information will largely be ignored by the recipients of the information.

Although it would be possible to include non-requested information with requested information, if the non-requested information has so little relevance to the recipient, there is a danger that the recipient finds the sum of the information less relevant and stops viewing all of it or rescinds the request.

What is needed is a system and method that can draw a user's attention to non-requested information that may be relevant to the user's interests as determined by certain characteristics of the user.

SUMMARY OF INVENTION

A method and apparatus allows a potential recipient to request information and sends to the recipient non-requested information along with information requested. To reduce the possibility that an intended recipient will find the sum of the information received significantly less relevant than the requested information, the non-requested information can be selected for each intended recipient based on the likelihood that the intended recipient will find such information relevant to his or her interests. The non requested information may or may not be selected based on characteristics such as status information, which may include actions taken or not taken by the intended recipient. For example, at one time the non-requested information may include a suggestion to perform an action and at a later time non requested information may include a reminder to perform the action or a confirmation message or thank you message for performing the action. Other characteristics, such as feedback regarding requested or non-requested information sent previously to the intended recipient, may also be used in selecting the non-requested information, such as by selecting from among several versions of non-requested information to match characteristics of the intended recipient identified by the feedback.

DETAILED DESCRIPTION OF A PREFERRED EMBODIMENT

A. Computer System Basics, and Overview of System

Figure 1:
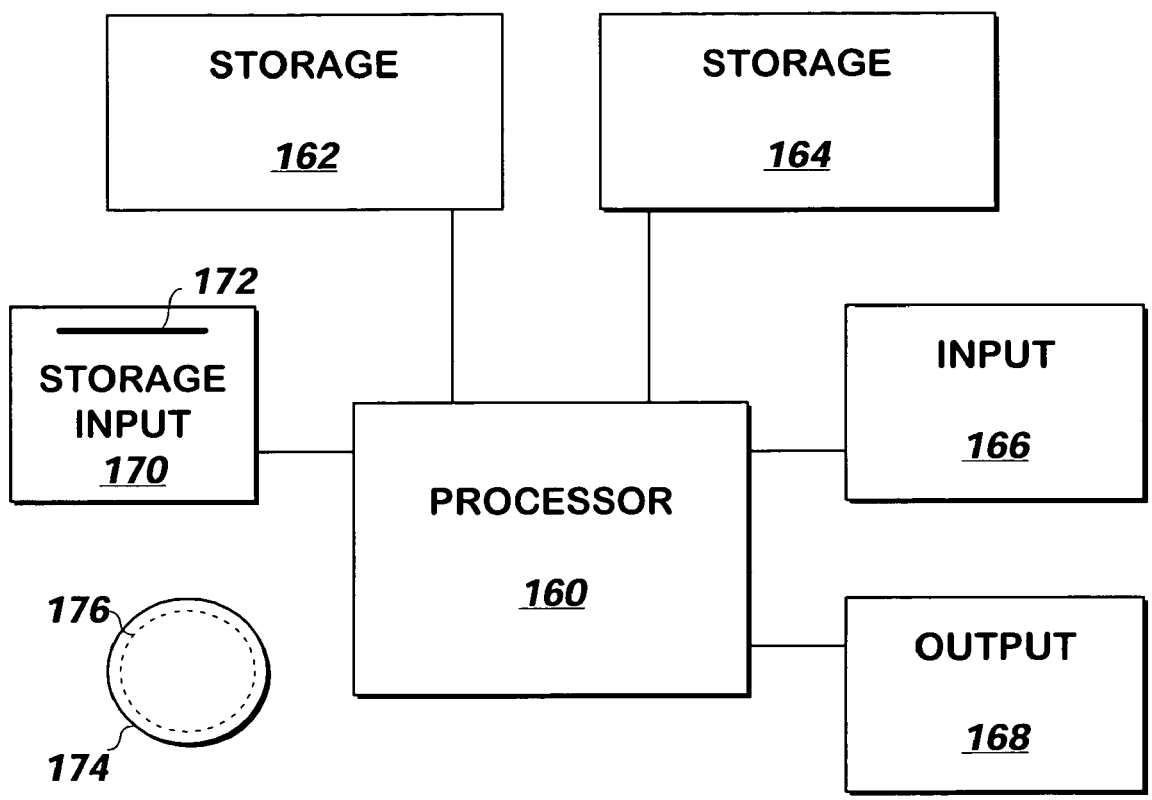
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10S computer running the Solaris operating system commercially available from Sun Microsystems of Mountain View, Calif., although other systems may be used.

Figure 2:
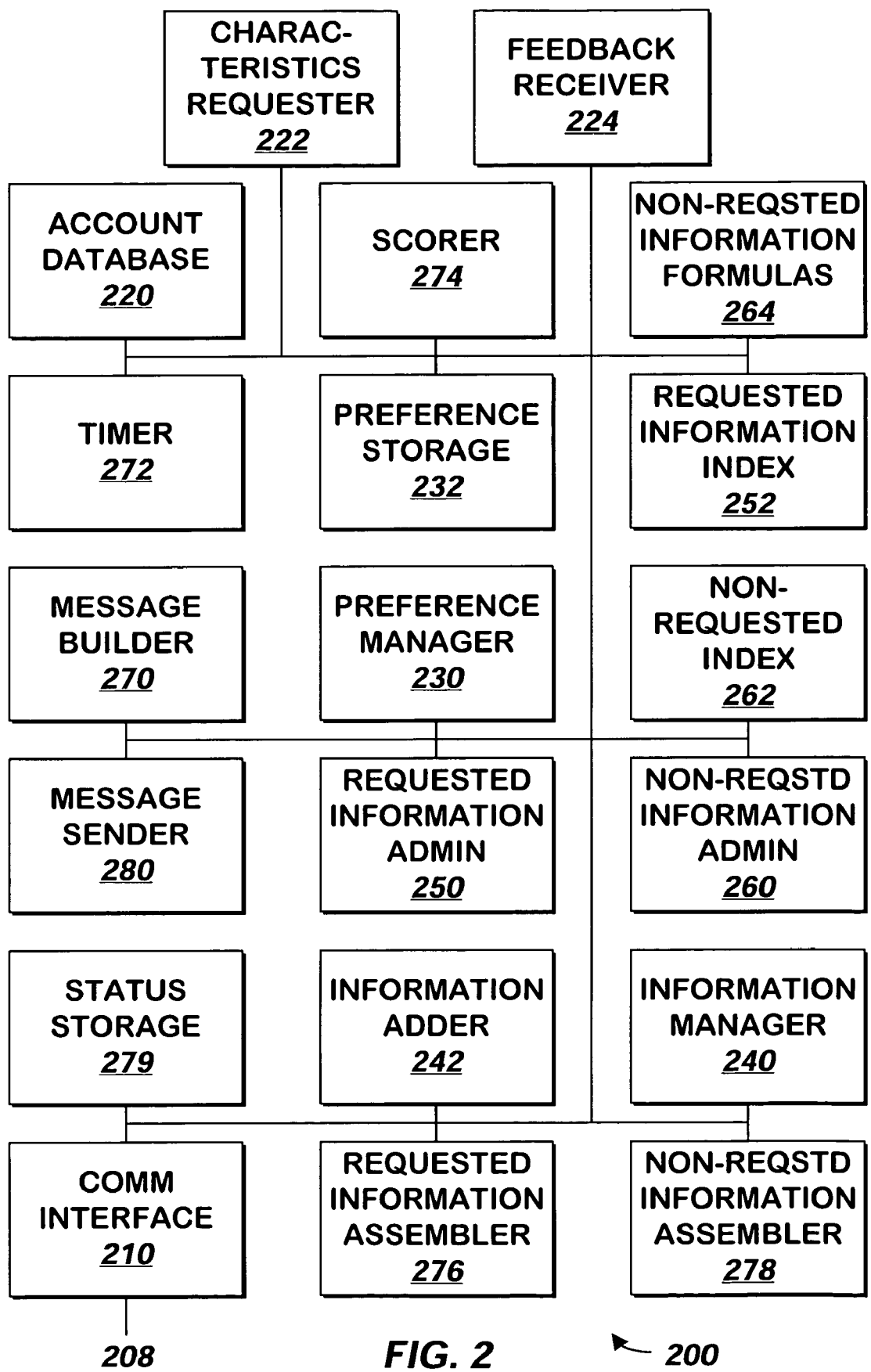
FIG. 2 is a block schematic diagram of a system for providing requested and non-requested information according to one embodiment of the present invention.

Referring now to FIG. 2, a system for providing requested and non-requested information is shown according to one embodiment of the present invention. The non requested information is provided with requested information, but only if the non-requested information is identified as potentially relevant to the recipient's interests. As described herein, the system 200 provides information related to securities such as stocks, bonds, mutual funds and the like, although in other embodiments, the system 200 provides other types of information or multiple types of information. The system 200 described herein is described with respect to e-mail messages, but any kind of messages may be sent, such as pager messages, wireless messages, instant messages, telephone messages and any other conventional messages.

B. Communication Interface and Account Database.

Communication interface 210 is a conventional communication interface and is coupled via input/output 208 to a conventional private or public communications network such as the Internet. Communication interface 210 may contain any conventional TCP/IP-compatible communication interface or any LAN or WAN interface or all of these. In one embodiment, communication interface 210 is used for all communication with the system 200 as described below, although local devices such as one or more keyboards/mice/monitor combinations may also be used.

Users and administrators, described below, communicate with various elements of system 200 using communication interface 210 via a conventional computer with a conventional web browser such as the conventional Internet Explorer product commercially available from Microsoft Corporation of Redmond, Wash., having a keyboard/monitor/mouse combination (not shown) or terminal (not shown) in communication with input/output 208, although other systems may be used.

Account database 220 is a conventional database such as the conventional DB2 product commercially available from IBM Corporation of White Plains, N.Y., or any other database, and includes information such as the name and address of the account holder or holders. Account database 220 also stores status about each user's account (e.g. securities held, cash held) as well as information about past trades (e.g. particular stocks traded, how many trades a user makes per month, etc.) or other transactions, such as deposits of cash to the account, records of services used, such as on-line or telephone quotations (e.g. date and time and ticker symbol of the most recent 30 quotations) or actions taken (e.g. request of a form or return of a completed form) and such information is included, without limitation, in the term "characteristics". Account database 220 stores some or all of the characteristics described herein.

"Characteristics" may include information about a user or a user's account, and need not be related to financial information. In one embodiment, "characteristics" includes demographic information and in another embodiment, "characteristics" excludes demographic information.

In one embodiment, "characteristics" includes psychographic information and in another embodiment, "characteristics" excludes phsychographic information. Psychographic information relates to how people act, for example, their propensity to take risks, such as whether a person trades or would trade options in additon to stocks, or would trade stocks but not options.

In one embodiment, "characteristics" includes information such as an activity taken with respect to a user, as well as action or lack of action taken in response to an activity. For example, an activity may be a request by a user, feedback provided by the user or an action taken with respect to a user. For example, characteristics of a user may include the fact that the user requested information about IRAs, the information was sent on a particular day, but that the user has not responded. This information could be used to send the user a reminder to respond.

In another example, when a user receives information as described herein, the user could provide feedback rating the relevance of the information/to that user or the value of the information or stating that the information was too complex or too simplistic. In one embodiment, some or all of the information such as requested information, non-requested information or both may have a link to a web page provided by feedback receiver 224. When feedback receiver 224 receives the request via the link, it reads a cookie on the user's system and uses the link and the cookie to record the feedback into account database 220. Similar information (e.g. requested information, non-requested information or information that is similar in scope or type to the information about which the user is providing feedback) or all information may be provided differently in response to this feedback, for example, by providing a more simplified version of some or all of the information provided to that user in the future.

In one embodiment, characteristics requester 222 periodically or occasionally or on request by the user or a system administrator gathers some or all of the characteristics such as psychographic information. This may be performed by polling the user with questions that can be used to identify the psychographic information, such as, "have you ever purchased an option or other derivative?"

Account database 220 is described herein as having information related to each user's account in a financial institution, although other information, such as that related to e-commerce, or information about non-electronic commerce activity, such as quotations requested by telephone by the user, or information submitted via survey or collected by third parties may be stored in account database 220.

C. Setting Preferences.

In one embodiment of the present invention, a user having an account in account database 220 (or another party on behalf of the user) sets preferences for the requested information to allow the requested information in the message that will be e-mailed to the user to be tailored to that user's interests. To set the preferences, the user logs into preference manager 230 (or uses a separate log in manager, not shown to log in and then connects to preference manager 230) and identifies requested information the user would like to receive.

The user may elect to receive information about securities in an account for the user that is maintained by the operator of the system or otherwise accessible by the system 200 for which information is stored in account database 220. If the user selects this preference, the requested information provided to that user will automatically change without further input from the user as the securities in the account change. The user may also elect to receive information about securities defined in one or more "watch lists" that the user also defines to preference manager 230. Watch lists contain ticker symbols or other identifiers of securities that, although not held in the user's account, may be of interest to the user. Preference manager 230 stores each security on a watch list in a watch list table stored in preference storage 232, which may include conventional storage and a conventional database. Each row of the watch list table may contain the ticker symbol or other identifier of the security, the user's customer identifier and a user-assigned name for the watch list.

(The present invention is described herein using multiple database tables for configuration purposes and for information storage and retrieval, among other purposes described herein. However, other data structures such as trees or lists may be used, and some information may be coded directly into the system 200 in other embodiments of the present invention.)

The user may also specify via preference manager 230 other types of information the user would prefer to receive. For example, the user may specify receiving closing numbers for certain market indices, such as the Dow Jones Industrial Average commercially available from Dow Jones & Co., Inc. of New York, N.Y.

In one embodiment, preference manager 230 allows the user to identify preferences and options for as many of the following types of requested information as the user prefers:

1. Account Activity Alerts. The user may specify to receive trade confirmations, trade notifications and a summary of expired instructions (for example, a limit order that is good for one day that did not execute).

2. Market Information. The user may specify to receive market analysis information for selected securities and the company related to the security. The market analysis information may include notifications that a security has hit or gone past a certain price target such as a ceiling or floor, information related to a company's earnings announcements, notifications that one or more analysts have changed their earnings recommendations and related information, breaking or general news about a the company and/or recently released analysts reports about the company.

3. Periodic Updates. News updates may be sent daily, along with a final market summary describing generally the activities of the market that day and monthly and quarterly summaries of mutual fund performance, daily closing prices of securities, weekly closing prices of securities including 52 week highs and trailing price to earnings ratios, and/or instantaneous news about securities as it is received. The user may select to receive any or all of the above updates for securities in the user's portfolio held by the brokerage operating the system 200, securities identified by the user as watchlists, or both of these. The user may select a format of closing prices that include the ticker symbol, security name, closing price, price change and trading volume, or may elect to replace the security name with the percentage price change and daily high and low. The user may select an option to suspend receiving such information (for example if the user goes on vacation), allowing the user to resume the information without having to remember the various information the user had elected to receive.

4. Periodic Market Information. The user may elect to receive market information at any of three times during the day (approximately 11:45 am, 2 pm, and 7:30 pm Eastern Time) that include news of general interest about the stock market, and may also elect to receive a currency report sent around 6 pm Eastern Time describing foreign currency prices. The user may select an option to suspend receiving such information (for example if the user goes on vacation), allowing the user to resume the information without having to remember the various information the user had elected to receive.

5. Events and General Information. The user may select preferences to allow the user to receive a monthly newsletter about certain topics related to investing, such as the basics of investing, or information about stocks, mutual funds, investing strategies, retirement and/or new products and services offered by the brokerage operating the system 200 or another company. The user may also select preferences to receive information about upcoming events, such as meetings in a speaker series.

Preference manager 230 receives the preferences specified by the user and stores indications of the preferences in a preference table stored in preference storage 232. The preference table contains a column for the user's customer identifier, a column for a type of requested information corresponding to the preference, and a column describing any options for that type of requested information that the user has selected. The user may identify preferences for as many types of requested information as he or she wishes and each preference is stored as a row in the preference table, meaning multiple rows of the preference table may have the same customer identifier.

When the user logs into or connects to preference manager 230, preference manager 230 reads from the preference table in preference storage 232 the preferences previously selected for that user and displays them as defaults in form elements on a web page that the user may use to select or deselect preferences and options of preferences. When the user presses a submit button, the preferences are transmitted using conventional CGI techniques to preference manager 230, which updates the preferences in the preference table in preference storage 232.

In one embodiment, preference manager 230 may be used to indicate that the user wishes to receive non-requested information without regard to whether the user has selected requested information to receive. This allows a user to receive non-requested information even if no requested information is received.

D. Receiving Content

Information that will be used as content in the body of e-mail messages is provided to the system from two types of sources. The first type of information is information that is received from third party sources, such as news feeds and the like. This information is received automatically by information adder 242 and stored in information manager 240. Information manager 240 contains storage such as memory or disk storage and may include a conventional database.

Information adder 242 assigns an identifier such as a serial number to each piece of information it receives and stores in information manager 240 the information indexed by the identifier in an information table of the database. A field in each row of the table identifies whether the information has been reviewed as described below (which is initialized to "false" for all pieces of information), and another field identifies the information as requested or non-requested information, and in one embodiment, all automatically received information is assumed to be requested information. Another field identifies the source of the information, which in this case is "automatic".

Another type of information is information that is generated by, or on behalf of, the entity that operates the system 200. An administrator who wishes to add this type of information to the system uses information adder 242 to add this type of information to the information table in information manager 240. Information adder 242 sets the source field in the information table to identify the information as "proprietary". In addition, information adder 242 allows the party adding the information to identify the information as potential requested information or non-requested information and information adder 242 sets a field in information manager 240 in the row containing the information to identify the information as potentially requested or non-requested. Information adder 242 also marks the information record in the information table in information manager 240 to indicate that the information has not been reviewed using the review processes described below.

Both types of information, requested and non-requested, are marked by information adder 242 with the date and time the information was received and stored in information manager 240. Both types of information may include any or all of conventional text, graphics (including banner or button advertisements) and/or links.

As described herein, the requested and non-requested information relates to financial information, however, the requested information and non-requested information could relate to other topics or different topics from one another.

E. Assigning Requested Information.

The information stored in information manager 240 is tagged as described herein to allow the system 200 to send the information in information manager 240 to each user that was either requested by the user or was not requested, but is pertinent to the user's interests. In one embodiment, two administrators, a requested information administrator and a non-requested information administrator assist with assigning the tags, although these two administrators may be the same person.

To assign the tags, the information may be automatically scanned to identify the proper tags to assign to the information. For example, if the information contains information about the company, Analog Devices, Inc., the information may be tagged with Analog Devices stock symbol, "ADI". If the same information also may relate to another chip maker, Texas Instruments. If so, the information may be tagged with the symbol, "TXN". The scanning may be performed automatically, manually or using both automatic and manual methods.

To assist with the tagging of the information stored in information manager 240, a requested information administrator uses requested information administration 250 to log into the system 200. Requested information administration 250 retrieves, one at a time, each piece of information from information manager 240 that is marked as not having been reviewed, and instructs information manager 240 to mark the information as having been reviewed by requested information administration 250.

The requested information administrator informs requested information administration 250 to allow the administrator to manually tag the piece of information, allow requested information administration to tag the piece of information or both. If the administrator manually tags the information, requested system administration 250 receives a list of tags provided by the administrator and assigns them to the piece of information as described below.

If requested information administration 250 tags the information, the system administrator can manually check the tags and use requested information administration 250 to correct tagging errors in the tags that it had assigned. In one embodiment, the administrator can rate the relevance of the tag or suggest alternative tags. In one embodiment, requested information administration 250 learns from these corrections to make future scans more accurate. For example, some articles about Analog Devices are written about "Analogue Devices". The system administrator could use requested information administration 250 to highlight the text, "Analogue Devices" and assign the symbol "ADI" to it, and requested information administration 250 would not only tag the piece of information with the symbol, "ADI", it would also remember to do so for automatic scans in the future.

In one embodiment, requested information administration 250 scans the content of the information to identify keywords or tagged fields that can be used to match the information with the potential preferences selected by the users.

Any ticker symbols that are in tagged fields or body text, and company names in the body text of the information, may be used to identify ticker symbols to which the information relates. Requested information administration 250 allows the requested information administrator to identify words or phrases that will trigger the automatic assignment of a tag to the information, and requested information administration internally stores a table that contains the keywords and the corresponding tag that should be generated for the information if the keyword, or something close to the keyword, is in the text of the information. For example, requested information administration may have a table entry with "Analog Devices" in a search column and "ADI" in a tag column. Requested information administration 250 scans the information and if it finds text matching or nearly matching the text in the search column, it assigns a tag corresponding to the tag column, e.g. "ADI", to the information by writing the identifier of the information and the tag into a table in requested information index 252. Some of the information in information manager 240 may already have tags assigned when the information is received, and these tags may also be used to populate requested information index 252.

Requested information administration 250 writes all of the tags it can identify for a specific piece of information along with the identifier of the information into the table in requested information index 252, and then displays the information and the tags it has provided to the requested information administrator. Requested information administration 250 allows the administrator to delete or add tags based on the information the administrator reviews, or to accept the tags and work on the next piece of information stored in information manager 240. The tags are added or deleted from requested information index 252 by requested information administration 250 based on the actions of the requested information administrator. Requested information administration 250 then selects the next piece of information (referred to as a "set" of information). In one embodiment, requested information administration 250 only selects information that is marked as being potentially requested and having a proprietary source, or any information marked as having an automatic source.

F. Assigning Non-Requested Information, and Formulas.

A non-requested information administrator logs into non requested information administration 260 to process unprocessed proprietary information not marked as requested and stored in information manager 240. In one embodiment, non-requested information administration 260 operates similarly to requested information administration 250, by scanning the proprietary information in information manager 240 and identifying keywords to automatically assign tags, with the option for manual assignment of keywords as well. In another embodiment, all tags are manually assigned to such proprietary information using non-requested information administration 260. In one embodiment, tags are assigned by placing the tag in a table contained in non-requested index 262. Each row in the table contains an identifier of the proprietary information stored in information manager 240 as well as one or more tags.

The non-requested information administrator uses non-requested information administration 260 to assign tags for each proprietary information not marked as requested and stored in information manager 240 which has not been reviewed.

In one embodiment, the non-requested information administrator may also use non-requested information administration 260 to identify formulas corresponding to each tag for proprietary information stored in non-requested index 262. These formulas may use any or all information available to system 200, such as the system date, system date and time, characteristic information stored in account database 220 as described above or any other information.

For example, non-requested information administration 260 may be used to define "too much cash" as "cash balance>0.2*account balance", where cash balance is a variable of account database 220 describing the total amount of cash stored in a user's account and account balance is a variable of account database 220 describing the total value of a user's brokerage account. Formulas may be time-related, so that the formula for a tag may be defined as a user's account having more than 20 percent cash for a consecutive week, or having more than 20 percent cash for a consecutive week and not having received the too much cash message for over six months.

A formula table stored in non-requested information formulas 264, containing conventional storage and a database, stores a column of tags, and a column of formulas corresponding to each such tags. As described in more detail below, at the time requested information is being assembled for a user, each of the formulas in the formula table are evaluated using the user's characteristics and status, as well as other status information such as a value of a system clock. If a formula evaluates to true, the tag in that row is used as described below to identify the non-requested information to send to the user.

Each of the formulas in the formulas table in non-requested information formulas 264 may use any characteristic in the account database 220, status information in status storage 279 and other information such as the value of a system clock to determine whether a keyword applies to a user. For example, a formula may be built that is true if a user has received a message indicating that he may wish to open an IRA account over a week ago and the user has not opened the IRA or requested a form for doing so. Another formula may be built that is true if a user requests an IRA form but has not returned the completed form after a specified amount of time. Another formula may be true if the user opens an IRA account. Thus, the use of formulas allows non-requested information to include not only information that is of interest to a user generally, but also information that is related to actions the user has or has not performed.

G. Triggering the Generation of Messages.

In one embodiment, requested information is provided to users at specific times and or dates. For example, periodic market information may be sent each trading day at the specific times described above. Periodic updates may be sent at the end of each trading day. Monthly newsletters may be sent on a particular day of the month, such as the last day, first day, first Monday or other similar day. Applicable confirmations of trades may be sent every 10 minutes during trading hours (and 10 minutes after the end of the day) or even instantly after the trade or nearly instantly, except at times other requested information is being sent.

Requested information administration 250 may be used by the requested information administrator to identify these times to timer 272. A timer table stored in timer 272 contains descriptions of the dates and or times and the type of requested information that corresponds to such dates and or times. Timer 272 periodically checks the system clock of the operating system (not shown) and when the system clock passes a time in the timer table, timer 272 passes to message builder 270 the type of requested information stored in the timer table and corresponding to such date and/or time. If multiple types of requested information correspond to the time, timer 272 passes all types of requested information corresponding to the date and/or time.

This allows information to be provided to a user in stages. For example, a user may receive one message if it has been three days since a response to an activity was expected, and a different message if it has been more than ten days since a response to an activity was expected. When the user responds, a thank you message may be provided to the user.

Requested information administration 250 stores as one or more of the times in the timer table in timer 272 the times to send non-requested information only to users who have elected to receive non-requested information without specifying requested information as described above. The type of requested information for these times is specified as "none".

H. Assembling the Requested Information.

When message builder 270 receives the type of requested information from timer 272, for each user who selected a preference for that type of requested information, message builder 270 builds an e-mail message using conventional e-mail formats that include any requested information that corresponds to the type of requested information received from timer 272 as well as any non-requested information that is available for the user. If message builder 270 is processing messages when a type is received from timer 272, message builder queues the type for later processing or sends the type to a duplicate of message builder 270.

To retrieve the requested information corresponding to the type it receives, message builder 270 identifies in preference storage 232 the customer identifiers having preferences corresponding for the type of requested information corresponding to the type it received from timer 272. For example, if an account preference stored in the preference table for that account is to receive morning periodic account information and the type received from timer 272 was also morning periodic information, then that account is set up to receive requested information corresponding to the type message builder 270 received from timer 270. Message builder 270 selects the first of these accounts and sends to requested information assembler 276 the type it receives and the customer identifier of the selected account.

Requested information assembler 276 uses the type received from message builder 270 to identify the potential contents of the requested information it will provide to message builder for inclusion into the e-mail message for the user having the customer identifier received from message builder 270. Some requested information may be generated directly from the type, while other requested information may be generated from information in the user's account. For example, general market information (e.g. current values of certain indices such as the Dow Jones Industrial Average) may be provided with the periodic information, and this general market information may be retrieved without regard to user information such as preference options or account information. Other information may require consultation of preferences stored in preference storage 232 or account information stored in account database 220.

Requested information assembler 276 uses the type information to consult an internal table of the tags or commands that will correspond to the information that should be included with the requested information. For example, if a certain type of requested information should contain market indices, current prices of securities held in the user's account or described on watchlists, and news for these securities, the table may have a tag "opening message 1" followed by a tag "indices" followed by a command "prices" followed by a command "news" followed by a tag "closing message 1".

To retrieve requested information related to tags, requested information assembler 276 retrieves from information manager 240 all information having the identifiers corresponding to the tag in requested information index that have been inserted since the last date and/or time the requested information having the same tag was retrieved for the user, or the same type of requested information was scheduled to be provided, whichever is later. In one embodiment, this date and/or time is identified by requested information assembler 276 examining the preferences for that user, and determining when the last time that tag was used to locate requested information. For example, if the tag being used to retrieve requested information is stored in the internal table in a different type of information that was last scheduled to be provided eight hours ago, the date and time that tag was last used for the customer identifier received from message builder 270 is calculated by requested information assembler 276 as eight hours prior to the actual time or eight hours prior to the scheduled time used by the time 272 to trigger the sending of that type of information. The date and time each type of information is searched may be stored by requested information assembler 276 into the preference table in preference storage 232 and used to identify when the last time a particular keyword was used to locate requested information.

Commands are executed in a slightly different fashion from tags. Commands cause requested information assembler 276 to first identify the tags to use to perform the tag-based retrieval of information as described above. The instructions to be followed for the identification of tags may be stored in an internal representation in, or coded directly into, requested information assembler 276. For example, to execute the commands "news", requested information assembler 276 uses the customer identifier to retrieve the ticker symbols for all securities held the users account in account database and all of the ticker symbols corresponding to watch lists held for that user in preference storage 232. Requested information assembler then uses these ticker symbols as tags to retrieve any news corresponding to these tags. To execute the command "prices", requested information assembler 276 uses communication interface 210 to request from an external quotation service (or from a table of quotations stored from such service) price information for the tags produced by the news command and incorporates these prices into a text message describing the prices of the securities held by the selected account or on one or more watchlists for that account.

When requested information assembler 276 has completed assembling the requested information, it sends the requested information to message builder 270. If the type of requested information is "none", requested information assembler 276 signals message builder 270 without providing requested information. In such embodiment, the requested information is an empty set of requested information.

I. Assembling the Non-Requested Information and Tracking Status.

In addition to providing the customer identifier and type to requested information assembler 276, message builder 270 also signals non requested information assembler 278 by sending the customer identifier of the selected account and optionally sending the type of requested information with which the non-requested information will be incorporated. Non requested information assembler 278 assembles non-requested information from information manager 240 by identifying which of the information would be most relevant to the holder of the account by providing the customer identifier to scorer 274.

Scorer 274 identifies the keywords in the formulas table in non-requested information formulas 264 for which the customer identifier it receives meets the criteria described by the formula. In one embodiment, each term used in a formula may be defined in another table in non-requested information formulas to allow scorer 274 to discern how to locate the value of that term, and in another embodiment, all terms are assumed to be located in account database, and if they are not found there, are assumed to be located in status storage 279, described below, or they may relate to certain system functions such as the current date and/or time.

For example, using the formula described above, where "too much cash" is defined as "cash balance>0.2*account balance", cash balance and account balance may be located by non-requested information assembler 278 in account database 220. Scorer 274 retrieves the value of these terms from account database 220 for the customer identifier it receives and evaluates whether the criteria in the formula has been met for the account having the identifier it received from message builder 270. Scorer 274 provides to non-requested information assembler 278 the keywords in the row from the formulas table corresponding to the formulas that evaluated true. Non-requested information assembler 278 selects information from information manager 240 having the keywords returned by scorer 274 and provides this information to message builder 270 for inclusion in the message with the requested information.

In one embodiment, each row in the formulas table in non-requested information formulas 264 may contain the names of one or more status columns in a status table stored in status storage 229, made of conventional storage and a conventional database. Each row of the status table contains an customer identifier, and one or more status columns. When scorer 274 identifies a formula as true, it inserts the date and time into each such status column corresponding to the status column in the row with the formula identified as true in the formulas table in non requested information formulas 264 in the row corresponding to the customer identifier scorer 274 received. Any formula can make use of the status columns in the status table, so for example, once the "too much cash" non-requested information has been provided to a user, the user will not see the same message for another month by adding into the formula terms to ensure that the current date is at least one month greater than any date in a column that was date stamped the last time a too-much cash message was provided to the user as non-requested information.

In one embodiment, each row in the formula table has one or more type designator columns that designate the type of requested information for which the formula is applicable, and the type is also provided to scorer 274 by non-requested information assembler 278. Scorer 274 only evaluates as true the formulas for rows having a type corresponding to the type of requested information it receives from non-requested information assembler 278. This allows the formulas to be specific to one or more types of requested information. For example, if the type of requested information is a confirmation of a trade, a formula that corresponds to an offer for shares of an IPO may be evaluated so that if the holder of the account traded shares of any of several companies that are similar to the company having its IPO, the holder of the account can receive an offer to purchase shares in an IPO of a similar company when he or she receive a confirmation of the trade.

Non-requested information assembler 278 then assembles the information from information manager 240 corresponding to the formulas that scorer evaluated as true and provides them to message builder 270. If no non-requested information applies to the user, non-requested information assembler 278 so reports.

The use of non-requested information described above allows the system to trigger the inclusion of a message describing how to address certain relevant problems or recommendations such as too much cash in the user's account, or provide other information relevant to a given user when the user receives the requested information. For example, the non-requested information may be a recommendation to peruse a list of no-load mutual funds that the user can use to park funds, and a link to a web page that displays that list. Other examples of non-requested information may be a thank you message triggered when the user makes a deposit into his or her account, information about an initial public offering in a stock when a user trades a related stock, or a recommendation to have the user's portfolio analyzed if the user has too concentrated a position in one stock.

Relevant help and advice of all kinds may be provided to a user based on characteristics of the user. For example, once a user makes an investment, additional steps the user may wish to take may be periodically described in non-requested information to assist the user in executing an investment plan without the entire plan to the user at the beginning of the process, potentially overwhelming the user or causing him or her to forget about later steps.

J. Assembling and Sending the Message.

Message builder 270 builds the message such as an e-mail message including the requested information and the non-requested information. In one embodiment, all non requested information is placed either before, in one embodiment, or after, in another embodiment, the requested information. In another embodiment, the non-requested information includes a tag that indicates whether it should be placed before or after the requested information and message builder 270 strips the tag and uses it to place the non-requested information in the message.

When message builder has completed building the message, it sends it to message sender 280 which is a conventional mail transfer agent such as the conventional Sendmail program, and sends it to the e-mail account stored in account database 220 for the customer identifier message builder selected as described above. Message builder 270 then selects from the customer identifiers identified as described above the customer identifier of another account it has not already selected for the session until all account identifiers have been selected, at which point the session is complete and message builder awaits the next signal with the type of requested information from timer 272.

Figure 3:
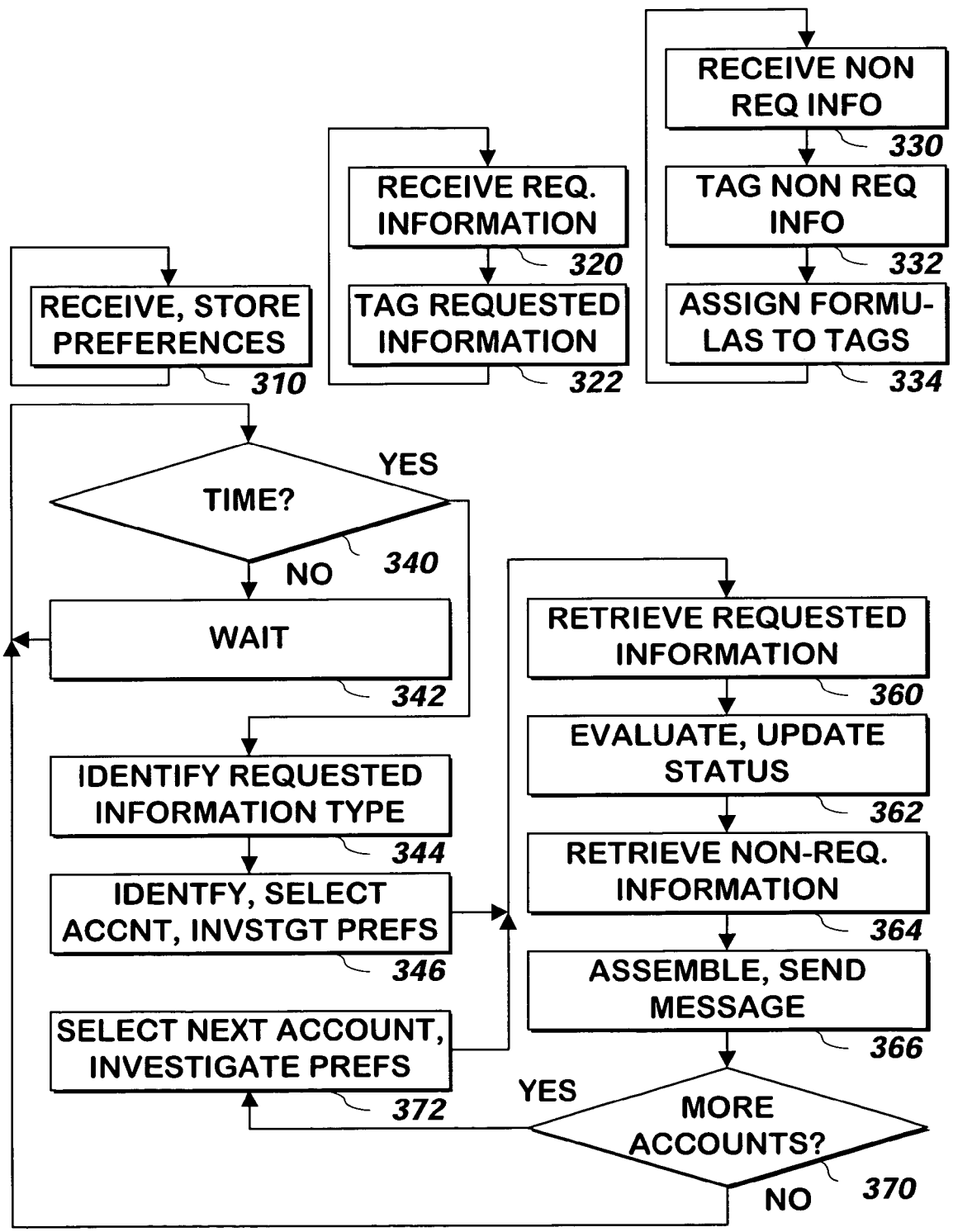
FIG. 3 is a flowchart illustrating a method of providing requested and non-requested information according to one embodiment of the present invention.

Referring now to FIG. 3, a method of sending requested and relevant non-requested information to a user is shown according to one embodiment of the present invention. Preferences are received and stored as described above 310 in a continuously running process.

In another continuously running process, requested information is received and stored as described above 320. The requested information may be tagged, either automatically, manually, or both, as described above 322.

In another continuously running process, non-requested information is received and stored as described above 330.

The non-requested information is tagged, either automatically, manually, or both, as described above 332. Formulas are assigned to tags as described above 334.

In another continuously running process, a clock is checked to identify whether or not the time matches a time for a type of requested information and if the time does not match 340, the method waits 342 and repeats step 340. At such time as a type of requested information is due 340, the type of requested information is identified 344. The accounts that have set up preferences for that type of requested information in step 310 are identified as described above, and from these identified accounts, an account is selected, and its preferences investigated 346.

The requested information is retrieved as described above 360. The formulas received in step 334 are applied to information about to the user and other information to evaluate the formulas as described above, and any status information may be updated as a result of the evaluation of a formula 362. Non-requested information corresponding to the formulas that evaluated to true for the account selected in step 346 are retrieved 364 as described above. An e-mail message is assembled 366 and sent using the requested information retrieved in step 360 and the non-requested information retrieved in step 364, as described above. If there are more accounts from among those identified in step 346 370, the next account from those identified is selected and its preferences investigated 372 and the method continues at step 360. Otherwise, the method continues at step 340.

What is claimed is:

1. A method of building a message intended for an intended recipient, the method comprising:
   selecting at least one first set of information corresponding to at least one preference of the intended recipient;
   selecting at least one second set of information responsive to a first set of at least one characteristic of the intended recipient;
   providing in the message the at least one first set of information selected and the at least one second set of information selected;
   assigning at least one formula to at least one of the at least one second set of information; and
   wherein the selecting at least one second set of information step comprises evaluating the at least one formula according to the at least one characteristic of the intended recipient.

2. The method of claim 1 wherein the message is an e-mail message.

3. The method of claim 1 wherein the at least one first set of information and at least one second set of information comprise financial information.

4. The method of claim 1 wherein the preferences are received from the intended recipient.

5. The method of claim 1 wherein the at least one characteristic comprise at least one selected from:
   status of at least one account in at least one financial institution; and
   a change made to the at least one account in at least one financial institution.

6. The method of claim 1 wherein the at least one first set of information is selected responsive to a second set of at least one characteristic of the intended recipient.

7. The method of claim 6 additionally comprising the step of identifying and storing associated with each of the at least one first set of information at least one tag corresponding to at least one of the at least one characteristic to which said set of information corresponds.

8. The method of claim 7 wherein:
the identifying and storing step comprises automatically scanning said set of information for at least one set of text to find the at least one set of text; and
the at least one characteristic to which said set of information corresponds is responsive to the at least one set of text found.

9. The method of claim 1 wherein at least one of the at least one characteristics in the first set is in the second set.

10. The method of claim 1 wherein the first set of at least one characteristic of the intended recipient comprises a status of at least one action of the intended recipient.

11. The method of claim 10 wherein the status comprises at least one selected from a response received from the intended recipient and a response not received from the intended recipient.

12. The method of claim 11 wherein the second set of information comprises at least one selected from:
a reminder to respond responsive to the status comprising the response not received; and
at least one selected from a confirmation message and a thank you message responsive to the status comprising the response received.

13. The method of claim 1, wherein the selecting at least one second set of information step is responsive to feedback received from the intended recipient regarding information provided to the intended recipient prior to the selecting at least one second set of information step.

14. The method of claim 1, wherein the at least one first set of information is an empty set.

15. A computer program product comprising a computer useable medium having computer readable program code embodied therein, for building a message intended for an intended recipient, the computer program product comprising:
computer readable program code devices configured to cause a computer to select at least one first set of information corresponding to at least one preference of the intended recipient;
computer readable program code devices configured to cause a computer to select at least one second set of information responsive to a first set of at least one characteristic of the intended recipient;
computer readable program code devices configured to cause a computer to provide in the message the at least one first set of information selected and the at least one second set of information selected;
computer readable program code devices configured to cause a computer to assign at least one formula to at least one of the at least one second set of information; and
wherein the computer readable program code devices configured to cause a computer to select at least one second set of information comprise computer readable program code devices configured to cause a computer to evaluate the at least one formula according to the at least one characteristic of the intended recipient.

16. The computer program product of claim 15 wherein the message is an e-mail message.

17. The computer program product of claim 15 wherein the at least one first set of information and at least one second set of information comprise financial information.

18. The computer program product of claim 15 wherein the preferences are received from the intended recipient.

19. The computer program product of claim 15 wherein the at least one characteristic comprise at least one selected from:
status of at least one account in at least one financial institution; and
a change made to the at least one account in at least one financial institution.

20. The computer program product of claim 15 wherein the at least one first set of information is selected responsive to a second set of at least one characteristic of the intended recipient.

21. The computer program product of claim 20 additionally comprising computer readable program code devices configured to cause a computer to identify and store associated with each of the at least one first set of information at least one tag corresponding to at least one of the at least one characteristic to which said set of information corresponds.

22. The computer program product of claim 21 wherein:
the computer readable program code devices configured to cause a computer to identify and store comprise computer readable program code devices configured to cause a computer to automatically scan said set of information for at least one set of text to find the at least one set of text; and
the at least one characteristic to which said set of information corresponds is responsive to the at least one set of text found.

23. The computer program product of claim 15 wherein at least one of the at least one characteristics in the first set is in the second set.

24. The computer program product of claim 15 wherein the first set of at least one characteristic of the intended recipient comprises a status of at least one action of the intended recipient.

25. The computer program product of claim 24 wherein the status comprises at least one selected from a response received from the intended recipient and a response not received from the intended recipient.

26. The computer program product of claim 25 wherein the second set of information comprises at least one selected from:
a reminder to respond responsive to the status comprising the response not received; and
at least one selected from a confirmation message and a thank you message responsive to the status comprising the response received.

27. The computer program product of claim 15, wherein the computer readable program code devices configured to cause a computer to select at least one second set of information are responsive to feedback received from the intended recipient regarding information provided to the intended recipient prior to operation of the computer readable program code devices configured to cause a computer to select at least one second set of information.

28. The computer program product of claim 15, wherein the at least one first set of information is an empty set.

29. A system for building a message intended for an intended recipient, the system comprising:
a requested information assembler having a first input operatively coupled to receive a at least one of a plurality of first sets of information and a second input operatively coupled to receive at least one preference of the intended recipient, the requested information assembler for selecting and providing at an output at least one of the plurality of first sets of information at the requested information assembler first input corresponding to the at least one preference of the intended recipient received at the requested information assembler second input;

a scorer having an input for receiving at least one formula assigned to at least one of the at least one second set of information, and at least one characteristic of the intended recipient, the scorer for evaluating the at least one formula according to the at least one characteristic of the intended recipient, and for providing at an output at least one result of such evaluation;

a non-requested information assembler having a first input operatively coupled to receive a plurality of second sets of information, a second input operatively coupled to receive at least one characteristic of the intended recipient, and a third input coupled to the scorer output for receiving the at least one result, the non-requested information assembler for selecting and providing at an output at least one of the plurality of second sets of information at the non-requested information assembler first input, responsive to the at least one result received at the non-requested information assembler third input and corresponding to the at least one characteristic of the intended recipient received at the non-requested information assembler second input; and a message builder having a first input coupled to the requested information assembler output and a second input coupled to the non-requested information assembler output, the message builder for building a message comprising the at least one first set of information received at the message builder first input and the at least one second set of information received at the message builder second input.

30. The system of claim 29 wherein the message is an e-mail message.

31. The system of claim 29 wherein the at least one first set of information and at least one second set of information comprise financial information.

32. The system of claim 29 wherein the preferences are received from the intended recipient.

33. The system of claim 29 wherein the at least one characteristic comprise at least one selected from:
   status of at least one account in at least one financial institution; and
   a change made to the at least one account in at least one financial institution.

34. The system of claim 29 wherein the at least one first set of information is selected responsive to a second set of at least one characteristic of the intended recipient.

35. The system of claim 34 additionally comprising at least one information administration having a first input for receiving at least one tag, the at least one information administration for assigning at an output at least one tag to at least one selected from each of the plurality of first sets of information and each of the plurality of second sets of information, each of the at least one tag corresponding to at least one selected from a preference and a characteristic.

36. The system of claim 35 wherein:
   at least one of the at least one information administration additionally comprises a second input for receiving at least one set of at least one keyword and at least one tag;
   said at least one information administration is additionally for scanning at least one selected from at least one selected from each of the plurality of first sets of information and each of the plurality of second sets of information, and attempting to at least substantially match at least one of the at least one keywords received at the information administration second input; and
   the assigning for said at least one information administration is responsive to the attempt to at least substantially match.

37. The system of claim 36 wherein the at least one of the plurality of first sets of information is an empty set.

38. The system of claim 29 wherein at least one of the at least one characteristics in the first set is in the second set.

39. The system of claim 29 wherein the at least one characteristic of the intended recipient comprises a status of at least one action of the intended recipient.

40. The system of claim 39 wherein the status comprises at least one selected from a response received from the intended recipient and a response not received from the intended recipient.

41. The system of claim 29 wherein the at least one of the plurality of second sets of information comprises at least one selected from:
   a reminder to respond responsive to the status comprising the response not received; and
   at least one selected from a confirmation message and a thank you message responsive to the status comprising the response received.

42. The system of claim 29, additionally comprising a feedback receiver having an input operatively coupled for receiving feedback from the intended recipient regarding to at least one selected from non requested information and requested information sent to the intended recipient, the feedback receiver for providing the feedback at an output coupled to the non-requested information assembler second input.

\* \* \* \* \*